(12) United States Patent
Eleftheriadis et al.

(10) Patent No.: US 12,480,984 B2
(45) Date of Patent: Nov. 25, 2025

(54) METHOD AND SYSTEM FOR TESTING A PRINTED CIRCUIT BOARD

(71) Applicant: Telefonaktiebolaget LM Ericsson (publ), Stockholm (SE)

(72) Inventors: Lackis Eleftheriadis, Valbo (SE); Athanasios Karapantelakis, Solna (SE); Konstantinos Vandikas, Solna (SE); Aneta Vulgarakis Feljan, Stockholm (SE); Yifei Jin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 18/017,336

(22) PCT Filed: Jul. 22, 2020

(86) PCT No.: PCT/SE2020/050747
§ 371 (c)(1),
(2) Date: Jan. 20, 2023

(87) PCT Pub. No.: WO2022/019814
PCT Pub. Date: Jan. 27, 2022

(65) Prior Publication Data
US 2023/0296662 A1 Sep. 21, 2023

(51) Int. Cl.
*G01R 31/28* (2006.01)

(52) U.S. Cl.
CPC .............................. *G01R 31/2801* (2013.01)

(58) Field of Classification Search
CPC ................ G01R 31/28; G01R 31/2801; G01R 31/281–2813; G01R 31/2832–2839; G01R 31/302–304; G01R 31/308–311
(Continued)

(56) References Cited

U.S. PATENT DOCUMENTS

| | | |
|---|---|---|
| 5,218,294 A | 6/1993 | Soiferman |
| 5,714,888 A | 2/1998 | Naujoks |

(Continued)

FOREIGN PATENT DOCUMENTS

WO 2007/056226 A2 5/2007

OTHER PUBLICATIONS

International Search Report and Written Opinion dated Mar. 26, 2021 in International Application No. PCT/ SE2020/050747 (11 pages).

*Primary Examiner* — Eman A Alkafawi
*Assistant Examiner* — Rahul Maini
(74) *Attorney, Agent, or Firm* — Rothwell, Figg, Ernst & Manbeck, P.C.

(57) ABSTRACT

A testing system and method for testing a Printed Circuit Boards (PCBs) is provided. The method is being executed at a testing system which comprises a RF test analyzer; a RF energy source; and one or more RF probes. The method includes performing a first level scanning of a first set of components in the PCB. The method further includes performing a second level scanning of another set of components in the PCB, which differs from the first set of components in the PCB; the second level scanning is performed only if anomalies are identified which is based on analyzing the results of the performed first level scanning. The method further includes determining detailed root causes of the identified anomalies which is based on analyzing results of the performed second level scanning.

21 Claims, 9 Drawing Sheets

(58) Field of Classification Search
USPC .................................... 324/754.21, 754.31
See application file for complete search history.

(56) References Cited

U.S. PATENT DOCUMENTS

| | | | |
|---|---|---|---|
| 5,812,563 | A | 9/1998 | Hedlund et al. |
| 7,355,417 | B1 | 4/2008 | Shusterman et al. |
| 9,059,189 | B2 | 6/2015 | Keller, III et al. |
| 9,887,721 | B2 | 2/2018 | Keller, III et al. |
| 10,502,777 | B2 | 12/2019 | Bacher et al. |
| 10,520,535 | B1 | 12/2019 | Lau et al. |
| 2010/0277197 | A1 | 11/2010 | Deutsch et al. |
| 2011/0012609 | A1 | 1/2011 | S et al. |
| 2012/0226463 | A1 | 9/2012 | Keller, III et al. |
| 2013/0044033 | A1* | 2/2013 | Nickel ............... G01R 29/10 343/703 |
| 2018/0011130 | A1 | 1/2018 | Aguayo Gonzalez et al. |
| 2018/0059169 | A1* | 3/2018 | Howard ............ G01R 31/2803 |
| 2019/0243735 | A1* | 8/2019 | He ................... G01R 31/3163 |

* cited by examiner

Single layer PCB

Multi layer PCB

Ball Grid Array (BGA)
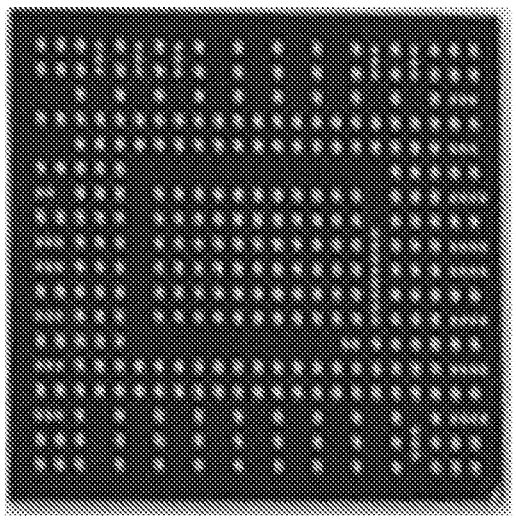
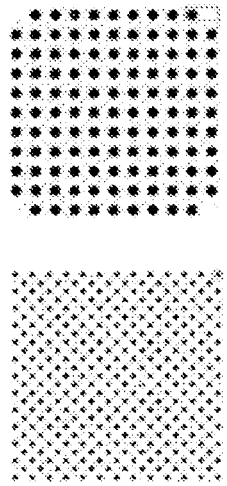
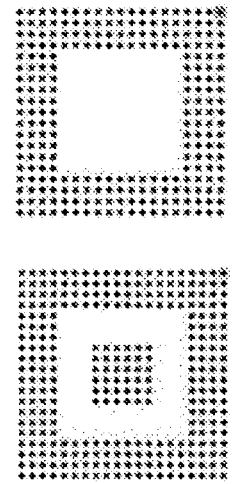
FIG. 2a
FIG. 2b
Testing System (300)
| RF Test Analyzer 310 | RF Energy Source 320 |
| RF Probes 330 | Testing Fixture 340 — PCB 350 |
FIG. 3

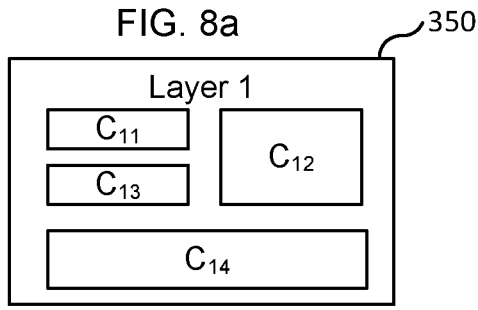
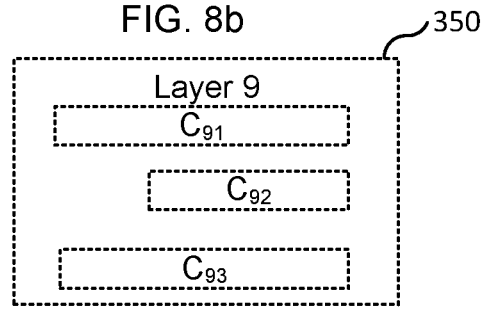
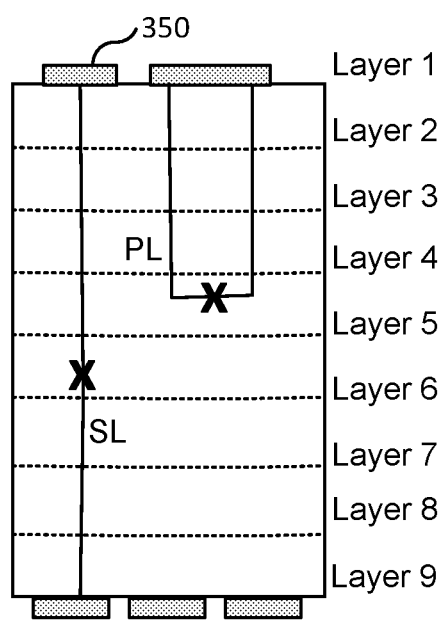
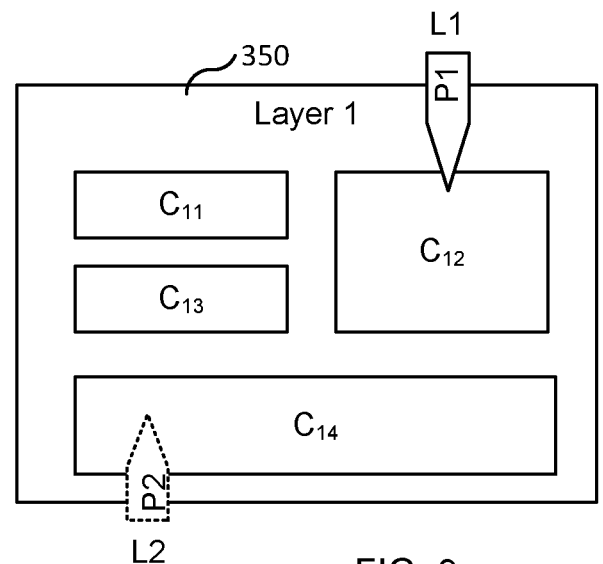
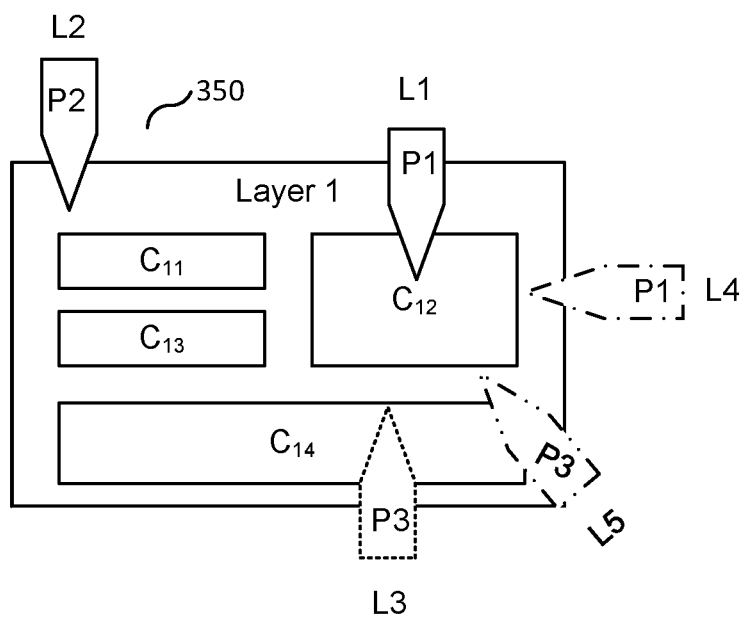

METHOD AND SYSTEM FOR TESTING A PRINTED CIRCUIT BOARD

CROSS REFERENCE TO RELATED APPLICATIONS

This application is a 35 U.S.C. § 371 National Stage of International Patent Application No. PCT/SE2020/050747, filed Jul. 22, 2020.

TECHNICAL FIELD

The invention relates to testing or verification of Printed Circuit Boards (PCBs). The invention relates to a method and a system for testing PCBs.

BACKGROUND

A printed circuit board (PCB) is a carrier for electrical connection of electronic components such as the Integrated Circuits (ICs). The PCB mechanically supports and electrically connects the different ICs that are typically surface mounted on the PCB. Typically, high cost and production time are involved in the PCB manufacturing process. In the manufacturing process of PCBs, the testing or inspection phase of a PCB is an essential stage. One of the main challenges faced during the testing or verification step is to identify or detect the different faulty components in the ICs and issues causing the faults. As shown in FIGS. 1a and 1b, PCBs can be single-sided, double-sided or multilayer. Multilayer PCBs as shown in FIG. 1c allow for much higher electronic component density, it includes different electronic components or ICs having various functionalities placed in different layers, power and signal lines going through different layers at varying depth with several complex circuit designs and interconnection paths etc. with many diverse functionalities. So, there are also challenges with regards to troubleshooting the interconnections and links between multiple layers especially when it comes to the multilayer PCB fabrication process.

Ball Grid Arrays (BGAs) which is a type of surface-mount packaging used for ICs. as shown in FIG. 2a, have multiple pins and each pin is provided with a solder ball so that microchips can be mounted or soldered on top. Typically, the BGAs have solder balls arranged in four patterns as shown in FIG. 2b, Full Grid, Perimeter, Staggered and Thermal Pads. In BGA IC packages as the under-side of the chip is used, the direct access to the connections is not possible easily which makes soldering, de-soldering and inspection or testing more difficult. So, during BGA manufacturing, there can be alignment issues, faulty broken connections between the pins due to voids, cold solder joints, and poor solder adhesion etc.

Typically, the PCB testing is done using visual testing which is not very efficient in finding faults in a PCB. The ICs manufacturing processes also use other different testing techniques which are already well established or known in the industry. U.S. Pat. No. 10,520,535B1 describes about a groundless radio frequency (RF) test probe design utilized during a testing stage of the manufacturing process of certain types of ICs present on a PCB. U.S. Pat. No. 10,502,777 discloses an electronic circuit testing method and device using RF wave verification techniques. U.S. Pat. Nos. 9,887,721 and 9,059,189 describes about anomaly detection and processing in electronic circuits using electromagnetic energy i.e. RF energy emission.

However, even with the currently used and known techniques for testing the PCB fabrication process, there is an absence of simple and time-efficient testing techniques. There is a need for a new improvised testing system for verifying the PCBs for faults during the manufacturing process.

SUMMARY

It is an object of embodiments herein to address at least some of the limitations, problems and issues outlined above. More specifically, it is an object of the invention to provide a method and testing system for testing a PCB in a simple and time-efficient manner.

These and other objects of embodiments herein are achieved by means of different aspects of the disclosure, as defined by the independent claims. Embodiments of the disclosure are characterized by the dependent claims.

According to a first aspect of embodiments herein, a method for testing a PCB is provided. The method is being executed at a testing system which comprises a RF test analyzer; a RF energy source; and one or more RF probes. The method includes performing a first level scanning of a first set of components in the PCB. The method further includes performing a second level scanning of another set of components in the PCB, which differs from the first set of components in the PCB; the second level scanning is performed only if anomalies are identified which is based on analyzing the results of the performed first level scanning. The method further includes determining detailed root causes of the identified anomalies which is based on analyzing results of the performed second level scanning.

According to a second aspect of embodiments herein, a testing system configured for testing a PCB is provided, the testing system comprises a RF test analyzer; a RF energy source; one or more RF probes; a memory; and a processor circuitry. The testing system is configured to perform a first level scanning of a first set of components in the PCB. The testing system is further configured to perform a second level scanning of a another set of components in the PCB, which differs from the first set of components in the PCB; the second level scanning is performed only if anomalies are identified which is based on analyzing the results of the performed first level scanning. The testing system is further configured to determine detailed root causes of the identified anomalies which is based on analyzing results of the performed second level scanning According to a third aspect of embodiments herein a computer program is provided comprising instructions which when executed by processing circuitry of a testing system causes the testing system to perform the method of any one of the embodiments of the first aspect.

According to a fourth aspect of embodiments herein a computer program product which is provided comprising an embodiment of a computer program according to the third aspect and a computer readable means on which the computer program is stored.

The use of moving RF probes provides the advantages such as increased test speed and improved access. The testing of the PCB is performed using two level scanning—first/optimal level scan and second/detailed level scanning wherein the second level scanning is only performed based on the outcome of the first level scanning; thus it helps in reducing the overall testing time typically taken for testing a PCB completely. The application of RF signatures and machine learning techniques (like artificial neural networks, reinforcement learning, deep reinforcement learning etc.)

for anomaly identification helps in greater fault coverage, which in turn improves the efficiency and accuracy of the testing system.

BRIEF DESCRIPTION OF THE DRAWINGS

The invention will now be described in more detail by means of some example embodiments and with reference to the accompanying drawings, in which:

FIGS. 2a & 2b show examples of different types of BGAs;

FIG. 3 shows a schematic overview depicting a testing system for testing a PCB according to a deployment of embodiments herein;

FIG. 8a-8c shows a schematic illustration of a multilayered PCB;

FIGS. 9a & 9b shows a schematic illustration of the testing of a multilayered PCB using a testing system according to embodiments herein;

DETAILED DESCRIPTION

Figure 1A:
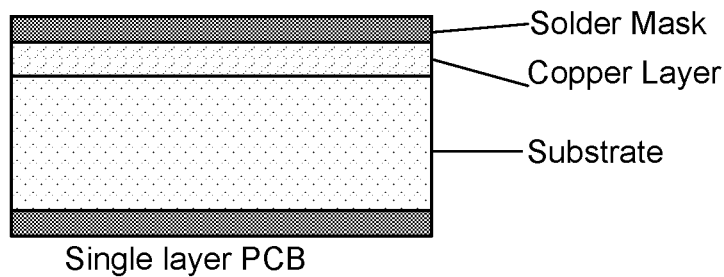
FIG. 1a to 1c show examples of different types of PCBs.
Figure 1B:
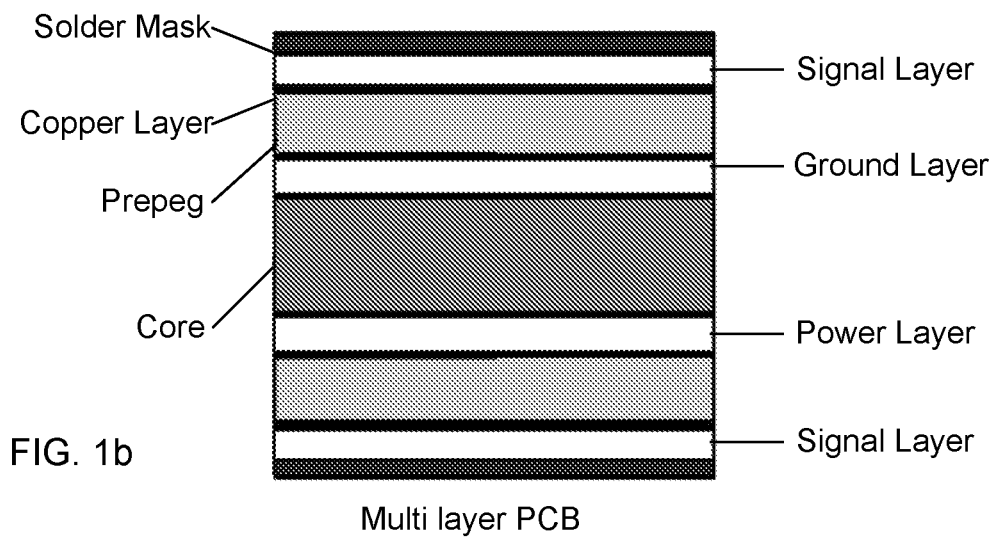

The invention will now be described more fully hereinafter with reference to the accompanying drawings, in which certain embodiments of the invention are shown. However, other embodiments in many different forms are possible within the scope of the present disclosure and should not be construed as limiting. Rather, the following embodiments are provided by way of example so that this disclosure will be thorough and complete, and will fully convey the scope of the disclosure to those skilled in the art. Like numbers refer to like elements throughout the description.

FIG. 3 shows a schematic illustration of a testing system 300 where embodiments presented herein may be applied. The testing system 300 provides a testbed for testing or verifying or inspecting a PCB for identifying anomalies and deducing the root causes for the identified anomalies. The testing system 300 comprises: a texting fixture 340, which is used for mounting the PCB 350 (which is shown in dotted lines in FIG. 3 as it is not a part of the testing system 300), that is to be tested or verified for anomalies; a RF energy source 320, which is an electric energy source for providing electric signals; one or more RF probes 330, which are used for capturing the different RF signal outputs; and a RF test analyzer 310, which is mainly used for processing and analyzing the RF signals and identifying the anomalies in the PCB 350.

The testing system 300 shown in FIG. 3 is suitable for implementing and executing the embodiments presented herein for testing the PCB 350 and will be explained in more detail below.

The PCB 350 which to be tested is typically mounted on the texting fixture 340 which is a part of the testing system 300 that facilitates in connecting the PCB 350 to other components of the testing system. The PCB 350, which comprises one or more ICs could be configured to be used in a computing device for example a mobile phone, a laptop, a Personal Digital Assistants (PDA), a tablet computer, an electronic pad, a desktop computer, a camera, a display device or similar computing device.

The RF energy source 320 is an electric energy source used for providing predefined signals varying over time for electrically activating the different ICs of the PCB 350. The RF energy source 320 is typically electrically connected to the testing fixture 340 on which the PCB 350 is mounted. For example, different varying electromagnetic signals generated by the RF energy source 320 are applied to different ICs of the PCB 350 which causes the different ICs of the PCB 350 to generate RF electromagnetic waves or signal outputs.

One or more RF probes 330 may be used for capturing the different RF signal outputs emitted from the different ICs of the PCB 350 when it is electrically activated using the RF energy source 320. The RF probes 330 could be mounted on a robotic arm for enabling it to move to different positions over the PCB 350, to capture the different RF signal outputs from different angles or sides of the PCB 350; such as measuring the RF signal outputs from top side, bottom side, sides angle positions etc. Various types of sensors such as position sensors, camera sensors etc. can be used along with the robotic arm for positioning the RF probes 330 at the desired position over the PCB 350 during testing.

The RF test analyzer 310 receives as input the different RF signal outputs captured by the RF probes 330. The RF test analyzer 310 is one of the integral components of the testing system 300. The RF test analyzer 310, typically comprises a Digital Signal Processor (DSP) and a Machine Learning (ML) component. The RF test analyzer 310 could comprise of one or more DSPs which are used for processing and analyzing the different RF signal outputs provided by the RF probes 330. DSPs processes, analyzes and classifies the RF signal outputs using various known types of signal processing and analysis techniques to generate different unique RF signatures. The RF signature could be similar to RF patterns such as based on turn ON/OFF characteristics of the different ICs in the PCB, or a certain serial bus communication patterns, in digital processing as transmitting a certain predefined message from one DSP to another DSP, or an RF pattern that can be default generated, and transmitted on demand, from one DSP to another DSP etc. The generated RF signatures are provided to the ML component, which may contain one or more different types of ML models which are typically trained using ML techniques like Neural Networks (NN), reinforcement learning (RL) etc. The ML component is used for generating and identifying testing or scanning conditions; analyzing, deducing and classifying RF signatures based on different conditions; detecting the anomalies and identifying associated details based on different affecting factors; determining the detailed root causes of the identified anomalies etc. The DSPs and ML component in the RF test analyzer 310 could be implemented in a single computing device or across multiple computing devices having physical connection or using distributed networks like cloud implementation. The RF probes 330 are connected to the RF test analyzer 310 via a coaxial cable or wireless connection or Internet of Things (IoT) device or other similar type of connections. The RF energy source 320 is also connected to the RF test analyzer 310 wherein, the RF test analyzer 310 may provide testing conditions to RF energy source 320 such as what type of varying signals needs to be applied to the PCB 350 for testing different ICs, at what durations, which functionality of the PCB is to be tested and so forth. The RF energy source 320 is connected to the RF test analyzer 310 via a coaxial cable or wireless connection or Internet of Things (IoT) device or other similar type of connections.

Figure 1C:
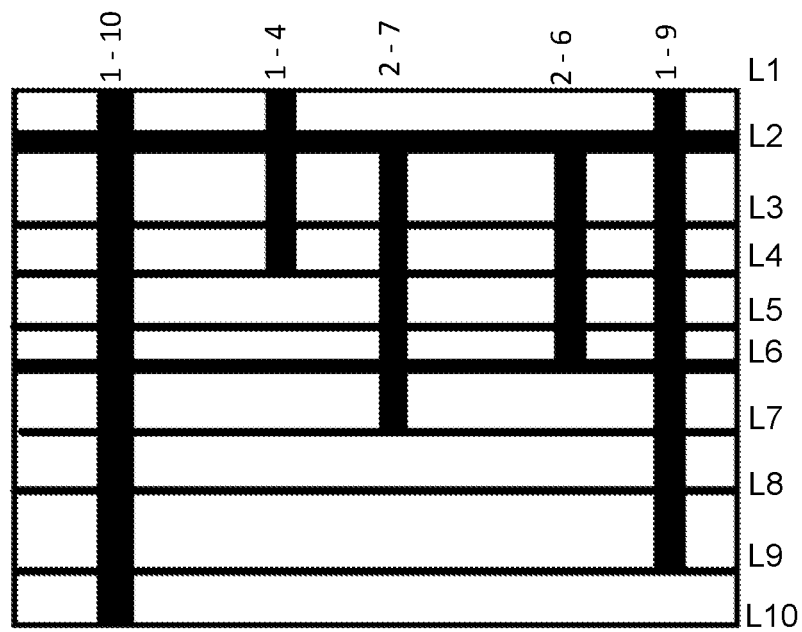

PCBs can be single-sided, double-sided or multilayer. A multilayer PCB could typically consist of 8 to 20 layers as shown in FIG. 1c. As multilayer PCB allow higher electronic component density, it includes different electronic components or ICs having various functionalities placed in different layers, power and signal lines going through different layers at varying depth with several complex circuit designs and interconnection paths etc. with many diverse functionalities. So, as the number of layers of the PCB increases it becomes difficult to access the various ICs and connections easily from the outside of the PCB. Thus, the testing process for different test scenarios or conditions becomes very complex. Even, the time taken for testing one PCB increases especially for a multilayer PCB which is not a favored condition by the large PCB manufacturing industries. Thus, the challenges associated with testing the PCB increases exponentially and it raises various implementation and consistency issues. Hereinafter, the different electronic components or ICs, power and signal lines etc. in a PCB which were to be tested for anomalies would be referred as components of the PCB.

As stated earlier in the background, many approaches are known and implemented for PCB testing or verification, but these does not solve the time issues and the testing complexities identified above. For example, in most of the available state of the art techniques, for testing a PCB for anomalies, the entire frequency cycle needs to be executed for every component of the PCB, even considering the different layers. The testing system set up needed and testing methods to be executed for the entire frequency cycle is very cumbersome and time consuming, and even have the risk of identifying false positives/negatives.

The generally known principle that every component, circuit board, ICs, power line, signal line etc. have a distinct frequency characteristic and behavior in the RF spectrum, is made use of in the proposed method 400 and testing system 300 for testing or verifying PCBs 350 for anomalies. The proposed PCB testing system 300 in this disclosure uses the concepts of RF signature and ML in combination for testing the PCB 350 components using different levels or stages of scanning in a simple and time efficient manner. When different varying electromagnetic signals are applied to the different components of the PCB 350, it causes the different components of the PCB 350 to generate unique RF electromagnetic waves or signal outputs. The RF electromagnetic waves or signal outputs generated for each component of the PCB 350 varies based on different affecting factors such as properties of electromagnetic signal applied, functionality of the component tested, position or angle from which the signal is measured, depth of the component in the PCB, duration which may include part of the pathloss, or latency in signals etc. The RF electromagnetic waves or signal outputs generated for each component of the PCB 350 would be processed and analyzed based on the different affecting factors, then different unique RF signatures are identified for each component of the PCB 350. The identified RF signatures are further classified and evaluated using ML techniques such as NN, RL etc. The RF electromagnetic waves or signal outputs generated for each component of the PCB 350 varies from the original signal depending on the presence of defects or anomalies in the PCB 350. If there are anomalies present in the PCB 350 there could be some missing frequencies in the RF electromagnetic waves or signal outputs generated by some components of the PCB 350, accordingly the unique RF signatures identified for some components of the PCB 350 would be different from the original. The anomalies and the detailed root causes of the identified anomalies could be determined using the ML techniques. The details about the RF signature identification and different analysis steps performed using ML are discussed in detail below.

The testing method proposed in this disclosure is using different levels or stages of testing. Typically, the first level scanning and second level scanning that are performed, and further higher levels of scanning are performed if required only. The first level scanning is a high-level scanning performed on a minimum or optimal number of components of the PCB 350. The second level scanning is a detailed level scanning performed for a specific set of components of the PCB 350 that are determined based on the anomalies identified during the first level scanning. If no anomalies are identified in the first level scanning, then second level scanning need not be performed. As the second level scanning is done based on the anomalies identified in first level scanning, the root causes of the anomalies could be identified and drilled down to specific component(s) of the PCB 350 and factor(s) causing the anomalies. In the first level scanning all the components of the PCB 350 are not tested, only an optimal or minimum number of components of the PCB 350 are selected for testing. Then, the second level scanning is performed only if anomalies are identified in the first level scanning. Thus, first and second level scanning helps in reducing the cost, complexity and time typically involved during testing of PCBs mainly multilayer PCB. The details about the different levels or stages of testing is described further below.

Figure 4A:
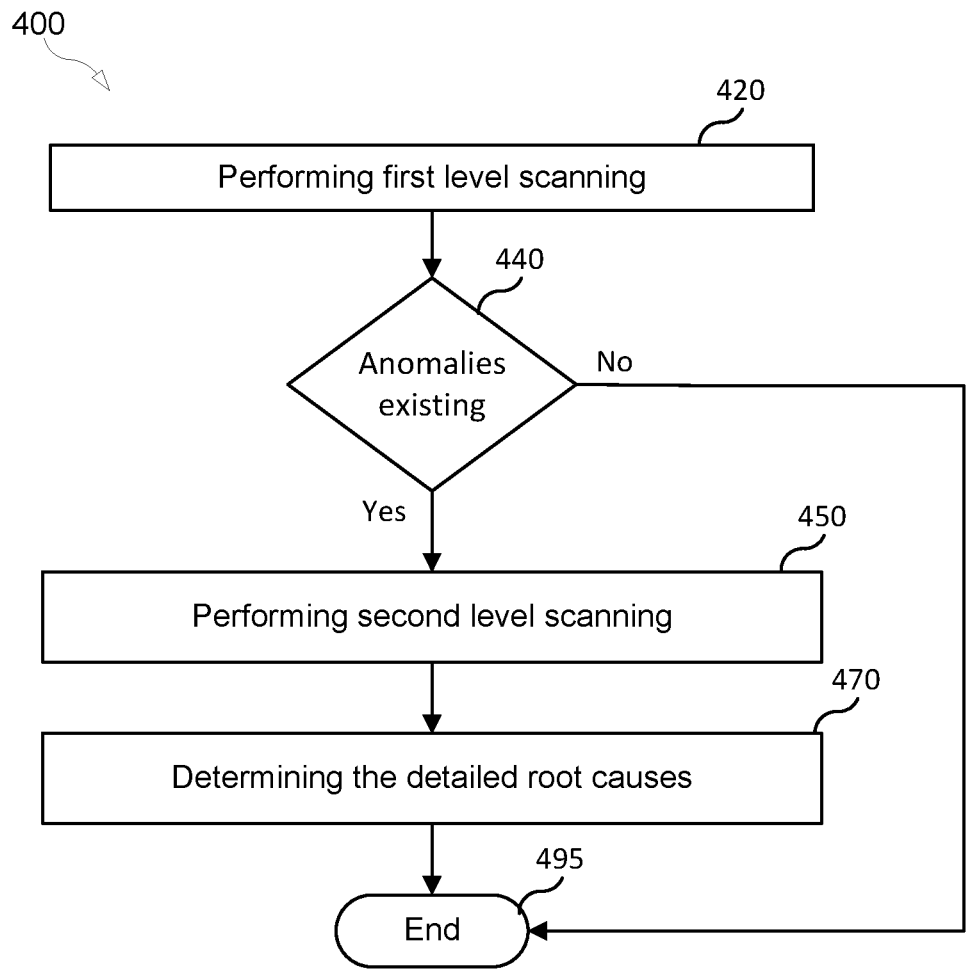
FIGS. 4a & 4b are flowcharts depicting a method performed a testing system for testing a PCB according to embodiments herein.

In FIG. 4a, a schematic flowchart of a method 400 for testing of a PCB is illustrated. The method 400 implements the testing system 300 comprising RF test analyzer 310, RF energy source 320 and RF probes 330 described above with reference to FIG. 3. The method 400 may comprise the steps described below. In some embodiments, some of the steps may be performed. In some embodiments, all the steps may be performed. One or more embodiments may be combined, where applicable. All possible combinations are not described to simplify the description. It should be noted that the examples herein are not mutually exclusive.

The method in FIG. 4a comprises the step of performing 420 a first level scanning of a first set of components in the PCB 350 using the different embodiments of the testing system 300. After performing the first level scanning, based on the analyzed results of the performed first level scanning, the method further comprises the step of identifying 440 if any anomalies are existing using the RF test analyzer 310. If no anomalies are identified, then the method may further comprise the step of completing 495 the testing process. If any anomalies are identified then the method further comprises the step of performing 450 a second level scanning of another set of components in the PCB 350, which differs from the first set of components in the PCB 350, using the different embodiments of the testing system 300. After performing the second level scanning, based on the analyzed results of the performed second level scanning, the method further comprises the step of determining 470 detailed root causes of the identified anomalies in the RF test analyzer 310. The method may further comprise the step of completing 495 the testing process.

Figure 4B:
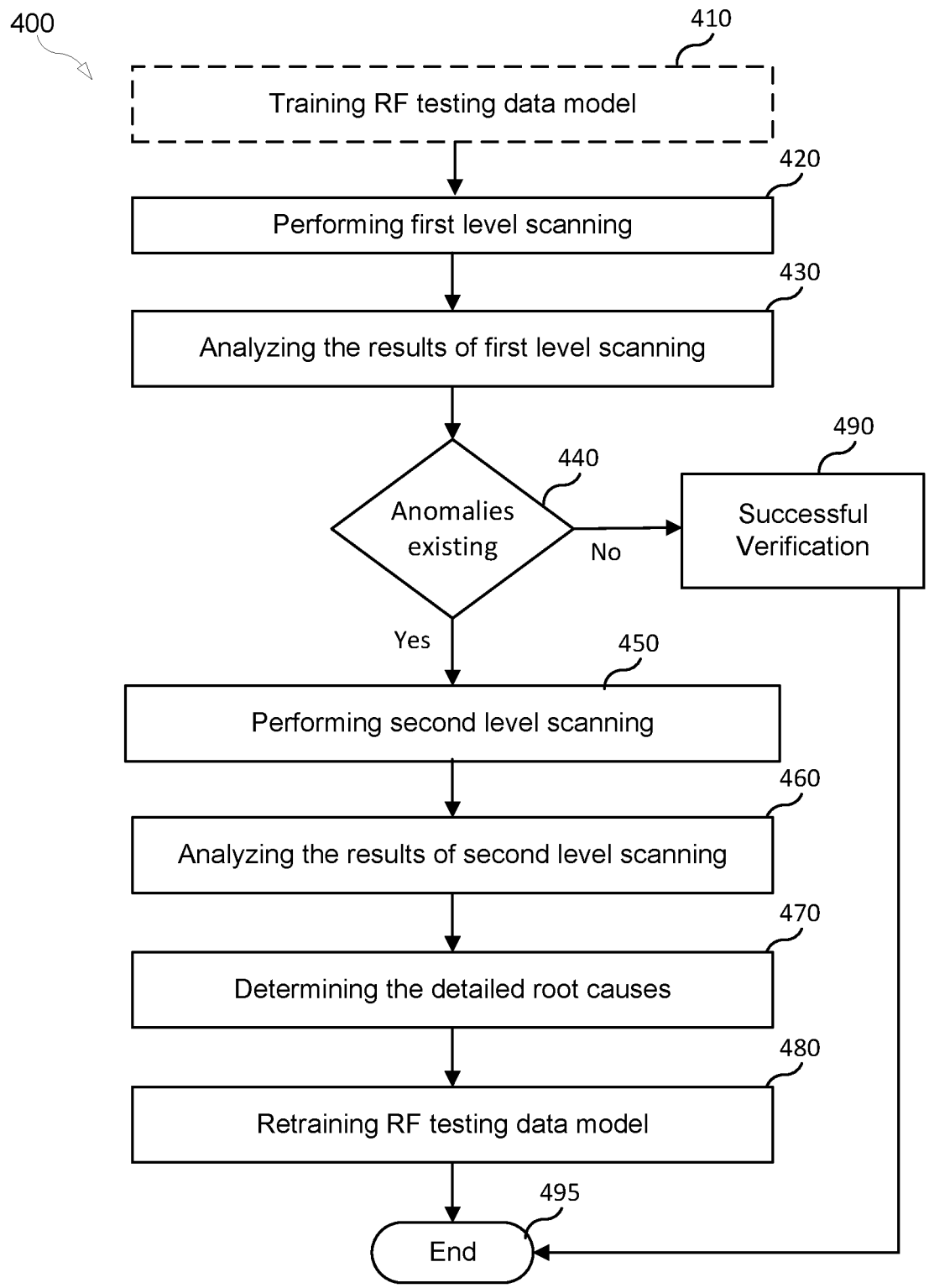

In FIG. 4b, a schematic flowchart of a method 400 for testing of a PCB is illustrated. The method 400 implements the testing system 300 comprising RF test analyzer 310, RF energy source 320 and RF probes 330 described above with reference to FIG. 3. The method 400 may comprise the steps described below. In some embodiments, some of the steps may be performed. In some embodiments, all the steps may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4b, optional actions are indicated with a dashed box.

The method in FIG. 4b comprises the steps of training 410 a ML model hereinafter referred as RF testing data model using ML techniques in the RF test analyzer 310. The method further comprises the step of performing 420 a first level scanning of a first set of components in the PCB 350 using the different embodiments of the testing system 300. After performing the first level scanning the method may further comprise the step of analyzing 430 the results of the performed first level scanning using the trained RF testing data model in the RF test analyzer 310. Based on the analyzed results of the performed first level scanning, the method further comprises the step of identifying 440 if any anomalies are existing using the RF test analyzer 310. If no anomalies are identified, then the method may further comprise the step of identifying 490 the testing process as a successful verification and completing 495 the testing process. If any anomalies are identified then the method further comprises the step of performing 450 a second level scanning of another set of components in the PCB 350, which differs from the first set of components in the PCB 350, using the different embodiments of the testing system 300. After performing the second level scanning the method may further comprise the step of analyzing 460 the results of the performed second level scanning using the trained RF testing data model in the RF test analyzer 310. Based on the analyzed results of the performed second level scanning, the method further comprises the step of determining 470 detailed root causes of the identified anomalies in the RF test analyzer 310. The method may further comprise the step of retraining 480 the testing data model based on identified associated new learnings using ML techniques in the RF test analyzer 310. The method may further comprise the step of completing 495 the testing process.

Figure 5:
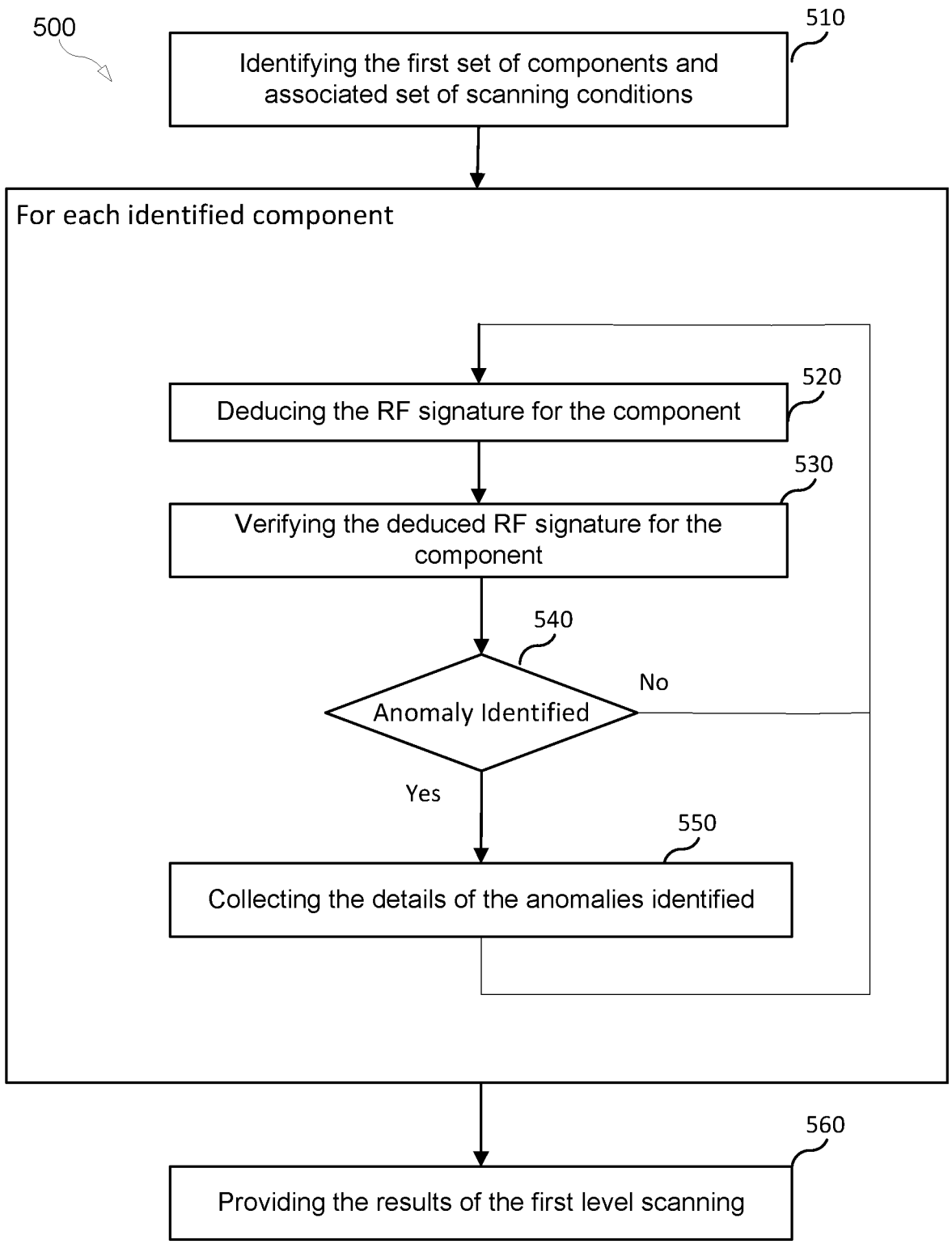
FIG. 5 shows a flowchart depicting a method performed a testing system according to embodiments herein.

In FIG. 5, a schematic flowchart of a method 500 for performing first level scanning during testing of a PCB is illustrated. The method 500 implements the testing system 300 comprising RF test analyzer 310, RF energy source 320 and RF probes 330 described above with reference to FIG. 3.

The method in FIG. 5 comprises the steps of identifying 510 a first set of components in the PCB 350 and associated set of scanning conditions for each component of the first set of components in the PCB 350 using the RF test analyzer 310. After the first set of components in the PCB 350 and associated set of scanning conditions are identified, then the steps of deducing the RF signature 520, verifying the deduced RF signature 530, identifying the anomalies 540 and collecting the anomaly details 550 are performed iteratively for each component of the first set of components, in the PCB 350 and its associated set of scanning conditions.

The method further comprises the step of deducing 520 RF signature for each component of first set of components in the PCB 350 based on the associated set of scanning conditions performed by the RF test analyzer 310. After deducing the RF signature, the method may further comprise the step of verifying 530 the deduced RF signature for each component of the first set of predetermined components using the trained RF testing data model in the RF test analyzer 310. Based on the verification of the deduced RF signature, the method further comprises the step of identifying 540 whether anomalies are existing which is performed by the RF test analyzer. If any anomalies are identified, then the method further comprises the step of collecting 550 the details of identified anomalies. After iteratively performing the steps of deducing the RF signature, verifying the deduced RF signature, identifying the anomalies and collecting the anomaly details, for every component of first set of components and associated set of scanning conditions in the PCB 350, the method further comprises the step of providing 560 the results of the first level scanning, performed using the different embodiments of the testing system 300.

Figure 6:
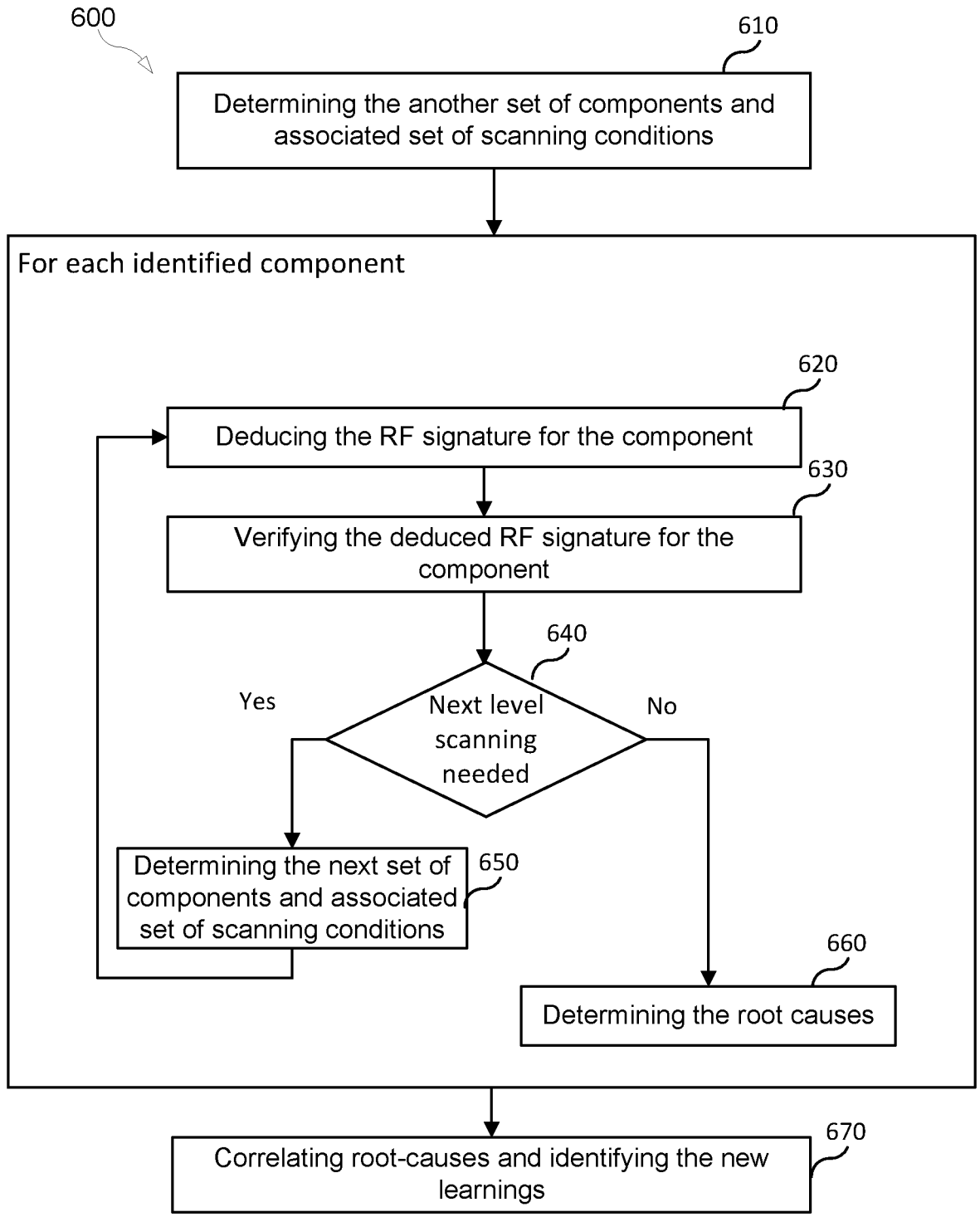
FIG. 6 shows a flowchart depicting a method performed a testing system according to embodiments herein.

In FIG. 6, a schematic flowchart of a method 600 for performing second level scanning during testing of a PCB is illustrated. The method 600 implements the testing system 300 comprising RF test analyzer 310, RF energy source 320 and RF probes 330 described above with reference to FIG. 3.

The method in FIG. 6 comprises the steps of determining 610 another set of components in the PCB 350 and associated set of scanning conditions for each component of the another set of components using the RF test analyzer 310. After the another set of components, in the PCB 350 and associated set of scanning conditions for each component of the another set of components using the RF test analyzer 310 are identified, then the steps of deducing the RF signature 620, verifying the deduced RF signature 630, determining the need for next level scanning 640, 650 and determining the root causes 660 are performed iteratively for each component of the another set of components, in the PCB 350 and its associated set of scanning conditions. The method further comprises the step of deducing 620 RF signature for each component of another set of components in the PCB 350 based on the associated set of scanning conditions performed by the RF test analyzer 310. After deducing the RF signature, the method may further comprise the step of verifying 630 the deduced RF signature for each component of the another set of predetermined components using the trained RF testing data model in the RF test analyzer 310. Based on the verification of the deduced RF signature, the method further comprises the step of determining 640 whether a next level scanning is needed or not. If next level scanning is needed, then the method further comprises the step of determining 650 a next set of components in the PCB 350 and associated set of scanning conditions for each component of the next set of components using the RF test analyzer 310 and performing the next level scanning, using the different embodiments of the testing system 300. If next level scanning is not needed, then the method further comprises the step of determining 660 the detailed root causes of the identified anomalies using the RF test analyzer 310. After iteratively performing the steps of deducing the RF signature, verifying the deduced RF signature, determining the need for next level scanning and determining the root causes, for every component of another set of components and associated set of scanning conditions in the PCB 350, the method further comprises the step of correlating 670 the determined detailed root causes for identifying the associated new learnings using the RF test analyzer 310.

Figure 7:
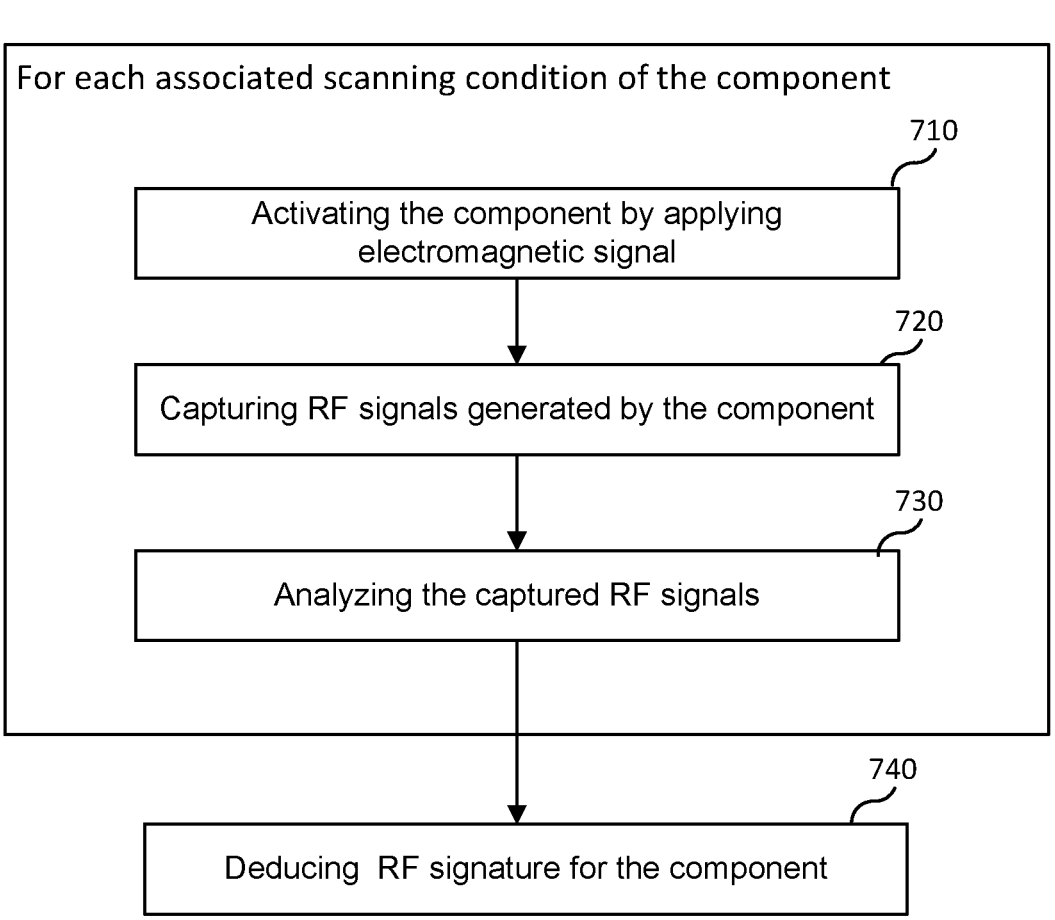
FIG. 7 shows a flowchart depicting a method performed a testing system according to embodiments herein.

In FIG. 7, a schematic flowchart of a method 700 for deducing the RF signature of the components of the PCB during testing of a PCB is illustrated. The method 700 implements the testing system 300 comprising RF test analyzer 310, RF energy source 320 and RF probes 330 described above with reference to FIG. 3.

The method in FIG. 7 comprises the steps of activating 710 a component in the PCB 350 by applying a set of electromagnetic signals generated using the RF energy source 320 based on the associated set of scanning conditions for the component in the PCB 350. The method further comprises, the step of capturing 720 RF signals generated by the activated component in the PCB 350 based on the applied set of electromagnetic signals using the RF probes 330. The method further comprises the step of analyzing 730 the captured RF signals for the component in the PCB 350 provided to the RF test analyzer 310 by the RF probes 330. The steps of activating a component 710, capturing RF signals 720 and analyzing the RF signals 730 are performed iteratively for each of the scanning condition in the associated set of scanning conditions for the component in the PCB 350. After the iteration, the method further comprises the step of deducing 740 a RF signature by the RF test analyzer 310 for the component in the PCB 350.

Each step of the method 400 shown in FIG. 4b will now be discussed in more detail, with reference to FIG. 3, method 500 shown in FIG. 5, method 600 shown in FIG. 6 and method 700 shown in FIG. 7.

The method 400 process may start at step 410, when the RF test analyzer 310 as part of the initialization of the testing system 300 would train the RF testing data model using different data sets like RF signature data, computer vision data, position coordinate data, RF signal data, root cause analysis data, pattern analysis data, electric signal data etc. The trained RF testing data model is typically used for generating and identifying testing or scanning conditions; analyzing, deducing and classifying RF signatures based on different conditions; detecting the anomalies and identifying associated details based on different affecting factors; determining the detailed root causes of the identified anomalies etc. during the testing process of the PCB 350. The RF testing data model could be implemented using artificial neural networks (ANN). For example, during the initialization of the testing system 300 i.e. at bootstrapping the weights of the ANN could be set to some random reference values for the RF signature data. The set of reference values would consist of the different reference RF signature values identified for each components of a defect free or ideal PCB device based on the different associated set of test scanning conditions; hereinafter 'set of test scanning conditions would be referred as 'scanning conditions.' The scanning conditions are typically any of the following factors or parameters which are considered separately or in combination for testing the different components of the PCB: properties of electromagnetic signal to be applied (e.g. frequency, amplitude etc.), functionalities of a component to be verified (e.g. IC type, IC properties—power and signal lines, different signal paths, different activation loads), different positions of testing (e.g. location point details of the probes), depth of the component in the PCB (e.g. single-sided, double-sided, multilayer) etc. So, different reference RF signature values could be identified for various combinations of components and scanning conditions. For example, let us consider a PCB which consists of a number of layers and every layer has a different number of components. Each PCB component is denoted as $C_{layer\_id,component\_id}$, where "component_id" is a unique identifier of the component belonging to a layer with "layer_id". The aforementioned identifiers could simply be integers, e.g. $C_{2,3}$ is the third component from the second layer. Alternatively, component_id could also be the serial number of a component. Each component $C_{layer\_id,component\_id}$ would have an associated scanning conditions set, $S_{layer\_id,component\_id}$, which say would consist of 'r' number of scanning conditions. For each of the scanning conditions in $S_{layer\_id,component\_id}$ when tested on for the PCB component $C_{layer\_id,component\_id}$, a different RF signal output is generated. Thus 'r' number of different RF signal outputs are generated for a scanning condition set $S_{layer\_id,component\_id}$ of the PCB component $C_{layer\_id,component\_id}$. The 'r' number of different RF signal outputs generated for the PCB component $C_{layer\_id,component\_id}$ are used to generate a unique RF signature for the PCB component $C_{layer\_id,component\_id}$. Thus, a unique RF signature would be generated for each PCB component $C_{layer\_id,component\_id}$ based on the associated scanning condition sets $S_{layer\_id,component\_id}$. Multiple scanning condition sets $S_{layer\_id,component\_id}^i$ can be associated with each PCB component $C_{layer\_id,component\_id}$. Thus, one or more unique RF signatures can be identified for each PCB component $C_{layer\_id,component\_id}$ based on the associated scanning condition sets $S_{layer\_id,component\_id}$. Therefore, a multi-layered PCB with multiple components in each layer, with different scanning condition sets $S$ $S_{layer\_id,component\_id}^{ii}$ associated with each of the component of the PCB, up to 'R' number of unique RF signatures could be generated for the PCB where, $$R = \Sigma S_{layer\_id,component\_id}^i.$$

for each component of the set of components in the PCB 350 based on the associated set of scanning conditions performed by the RF test analyzer 310. So, the RF testing data model could be trained with different unique RF signature data sets for different kinds of PCBs which comprises of various types components and scanning conditions sets. The initial set of random reference values could also be based on a set of reference values which are identified from a defect free or ideal PCB device. The set of reference values would consist of the different reference RF signature data, computer vision data, position coordinate data etc. identified for each components of a defect free or ideal PCB device based on the different scanning conditions. For identifying the different reference values for each components of a defect free or ideal PCB device based on the different scanning conditions, the testing system 300 could be used wherein first, the defect free or ideal PCB device is mounted on the testing fixture; then the different components of the defect free or ideal PCB device are activated using the RF energy source 320 based on the different scanning condition scenarios. The RF electromagnetic waves or signal outputs generated by each component of the defect free or ideal PCB device for different scanning condition scenarios are captured using the RF probes 330 and provided to the RF test analyzer 310. Then, in the RF test analyzer 310, the received RF electromagnetic waves or signal outputs from the RF probes 330 are typically recorded and classified based on the location points of the RF probes 330 in a two-dimensional space which may for example use the upper-left part of the PCB 350 as a reference point. The location of the RF probes 330 in a two-dimensional space here in the context of this embodiment would mean the different locations points at which the RF probes can be positioned from the PCB 350 to capture the RF signals. So, along with the captured RF electromagnetic waves or signal outputs, the location point details of the RF probes 330 used for capturing of the RF signal outputs during the time of measurement are also provided to the RF test analyzer 310. The location point details would typically comprise: details about location coordinates at which a probe is to be positioned from the PCB, the spacing distance between a probe and the PCB (for example, a probe can be positioned as close as 5-15 mm from the PCB), the angle at which a probe is to be positioned from the PCB etc. The RF test analyzer 310 using DSP(s) and the ML component using all this received signal data and other related information, identifies the different reference values for each components of a defect free or ideal PCB device based on the different scanning conditions and train the RF testing data model with the identified reference values. Different ML techniques like RL, deep RL etc. could be used for training the RF testing data model. The efficiency and accuracy of the RF testing data model keeps on improving as it is trained with different types of data sets which in turn increases the overall reliability of the process of testing a PCB 350 using testing system 300 for identifying the anomalies and detailed root causes. The initial training of the RF testing data model is an optional step. As ML techniques like RL, deep RL etc. are used, the RF testing data model would be self-learning and training itself automatically to identify different types of anomalies associated with different kinds of PCBs comprising various types components and scanning conditions. So, during the testing process of the different kinds of PCBs using the testing system 300 for identifying anomalies and detailed root causes, the RF testing data model would be continuously learning and improving. Thus, the application of RF signatures and ML techniques (like ANN, RL, deep RL etc.) for anomaly identification helps in greater fault coverage, which in turn improves the efficiency and accuracy of the testing system After the initialization of the testing system 300, the testing system 300 is now ready for testing and a PCB 350 which is to be tested for anomalies is mounted on the testing fixture 340 of the testing system 300. In step 420, a first level scanning of the PCB 350 is performed. The first level scanning will now be discussed in more detail, with reference to FIG. 3 and method 500 shown in FIG. 5.

The first step 510 of the first level scanning starts by the RF test analyzer 310 using the ML component in correlation with the PCB 350 for identifying a first set of components in the PCB 350 and associated scanning conditions. As explained before, for each component in the first set of components in the PCB 350 there would a set of associated scanning conditions. The first level scanning is typically a high-level scanning which is performed on an optimal set of components of the PCB 350 and associated scanning conditions, that means the testing is performed only for a certain minimum number of components and its functionalities which is sufficient to confirm that a PCB is functioning properly without any anomalies. The first set of components, $Cf_{mn}$, in the PCB 350 and associated scanning conditions, $Sf_{mn}i$, could be either preidentified or determined dynamically by the RF test analyzer 310. The $Cf_{mn}$ of the PCB 350 and associated $Sf_{mn}i$ can be preidentified based on the previous learnings derived from the testing of the different types PCBs by the testing system 300. Also, the $Cf_{mn}$ of the PCB 350 and associated $Sf_{mn}i$ can be dynamically determined or selected during the testing process by the RF test analyzer 310 based on any one or more of the following different parameters such as:

the type of PCB 350 to be tested;
testing environment conditions such as temperature, humidity etc. which could be automatically determined by the RF test analyzer or provided as input from an external source;
test intensity level requirements which could be programmable input values based on requirements like accuracy, time etc. For example, it could be set to values like low, medium, high etc.

After the $Cf_{mn}$, in the PCB 350 and associated $Sf_{mn}i$ are identified, then the steps 520, 530, 540 and 550 are performed iteratively for each component of $Cf_{mn}$, in the PCB 350 and its associated $Sf_{mn}i$.

In step 520, deducing a RF signature of a component of $Cf_{mn}$ in the PCB 350 based on the associated $Sf_{mn}i$ is performed by the RF test analyzer 310. The step of deducing a RF signature of a component of $Cf_{mn}$ in the PCB 350 based on the associated $Sf_{mn}i$ will now be discussed in more detail, with reference to method 700 shown in FIG. 7.

The method 700 process starts at step 710, when the RF test analyzer 310 activates a component of $Cf_{mn}$ in the PCB 350 based on the associated $Sf_{mn}i$ by applying the electromagnetic signals using the RF energy source 320. To activate the component of $Cf_{mn}$ in the PCB 350 based on the associated $Sf_{mn}i$, the RF test analyzer 310 using the ML component would for each associated scanning conditions in $Sf_{mn}i$, identify and provide details to the RF energy source 320 about the type of electromagnetic signal to be generated and how it has to apply it on to the PCB 350. As explained earlier, when an electromagnetic signal generated by the RF energy source 320 is applied on to the PCB 350, to activate the component of $Cf_{mn}$ in the PCB 350, then on activation the component of $Cf_{mn}$ in the PCB 350 generates unique RF electromagnetic waves or signal outputs. So, based on each associated scanning conditions in $Sf_{mn}i$, when different varying electromagnetic signals are applied on to the PCB 350, it activates the component of $Cf_{mn}$ in the PCB 350 to generate different types of RF electromagnetic waves or signal outputs.

In step 720, the RF electromagnetic waves or signal outputs generated by the activated component of $Cf_{mn}$ in the PCB 350, are captured using the RF probes 330. The various location points above the PCB 350 at which the one or more RF probes 330 are to be positioned for capturing the generated RF electromagnetic waves or signals are identified by the RF test analyzer 310. The RF test analyzer 310 using the ML component identifies for the component of $Cf_{mn}$ in the PCB 350 based on each associated scanning conditions in $Sf_{mn}i$, the various location point details, which would be provided to the RF probes 330. The location point details would comprise—details about location coordinates above which a probe is to be positioned, the spacing distance between a probe and the PCB (for example, a probe can be positioned as close as 5-15 mm from the PCB), the angle at which a probe is to be positioned etc. So, using the RF probes 330, the testing system is able to measure the RF signal generated from several positions from the PCB 350 mounted on the testing fixture 340 in faster manner, and thus it provides the advantage of not requiring to make heavy process of the data frequencies. The positioning of the RF probes 330 at various location points above the PCB 350, is coordinated or synchronized with the application of different electromagnetic signals on to the PCB 350 by the RF energy source 320 for activating the component of $Cf_{mn}$ in the PCB 350. The RF test analyzer 310 using the ML component synchronizes the coordination between the RF probes 330 positioning and the RF energy source 320 varying signal application for activating the component of $Cf_{mn}$ in the PCB

350 based on each associated scanning conditions in $Sf_{mn}i$. This in turn makes the scanning process faster and thus testing time can be saved or reduced. The different RF electromagnetic waves or signal outputs captured by the RF probes 330 are then provided to the RF test analyzer 310. In the RF test analyzer 310, the received RF electromagnetic waves or signal outputs from the RF probes 330 are typically recorded and classified based on the location of the RF probe 330 in a two dimensional space which may for example use the upper-left part of the PCB 350 as a reference point. As the RF probes 330 are mounted on a robotic arm, the probes could move in different directions and angles over the PCB 350 to capture the generated RF signals. Since the movement of the probes to different location points is achieved in coordination with the ML component, it makes the scanning process faster and thus testing time can be saved or reduced.

After receiving the captured RF electromagnetic waves or signal outputs from the RF probes 330, the RF test analyzer 310 then performs the step 730. In step 730, the RF test analyzer 310, processes and analyzes the RF electromagnetic waves or signal outputs received from the one or more RF probes 330. The received signals typically contain noise elements. The RF test analyzer 310 first processes the received signals to separate the electromagnetic RF patterns generated by the component of $Cf_{mn}$ in the PCB 350 from the other signal noise elements. The process of separating the electromagnetic RF patterns could be done using fast Fourier transform (FFT) or an autoencoder which is a specific type of ANN. The separated signals which now corresponds to the electromagnetic RF patterns generated by the component of $Cf_{mn}$ in the PCB 350 are analyzed using the DSP and the ML component. The RF electromagnetic waves or signal outputs generated by the component of $Cf_{mn}$ in the PCB 350 varies based on different affecting factors such as properties of electromagnetic signal applied, functionalities of the component tested, location point details of the probes, environmental conditions etc. So, the electromagnetic RF patterns generated by the component of $Cf_{mn}$ in the PCB 350 would be analyzed based on the different affecting factors also. For example, the electromagnetic RF patterns analysis could include pattern identification, feature extraction, dominant frequency analysis, power analytics etc. The steps 710, 720 and 730 are performed iteratively for each of the scanning condition in set $Sf_{mn}i$ associated to the component of $Cf_{mn}$ in the PCB 350.

After the iteration of the steps 710, 720 and 730 for each of the scanning condition in set $Sf_{mn}i$ associated to the component of $Cf_{mn}$ in the PCB 350, the RF test analyzer 310 performs step 740. In step 740, a RF signature is deduced or identified for the component of $Cf_{mn}$ in the PCB 350 using the different analyzed electromagnetic RF patterns identified for each of the scanning condition in set $Sf_{mn}i$ associated to the component of $Cf_{mn}$ in the PCB 350.

After deducing a RF signature of the component of $Cf_{mn}$ in the PCB 350 based on the associated $Sf_{mn}i$, the RF test analyzer 310 then performs the step 530. In step 530, the RF test analyzer 310, verifies the deduced RF signature of the component of $Cf_{mn}$ in the PCB 350 using the ML component. As stated earlier, the RF electromagnetic waves or signal outputs generated by the component of $Cf_{mn}$ in the PCB 350 varies depending on the presence of any defects or anomalies in the PCB 350. Accordingly, the deduced RF signatures of component of $Cf_{mn}$ in the PCB 350 would differ from the original if there are anomalies present in the PCB 350. The deduced RF signature of the component of $Cf_{mn}$ in the PCB 350 may be compared with a reference RF signature data available in the RF testing data model. If no mappings of the deduced RF signature of the component of $Cf_{mn}$ in the PCB 350 is found in the reference RF signature dataset, then the ML component of RF test analyzer 310 would perform further verification of the deduced RF signature of component of $Cf_{mn}$ in the PCB 350 to identify and confirm whether any anomalies exists. The verification process of the deduced RF signature process can comprise of different analysis processes like classification analysis, association analysis, correlation analysis etc. which could be implemented using ML techniques such as NN, RL etc. During the analysis process, various parameters pertaining to the component of $Cf_{mn}$ in the PCB 350 such as the associated $Sf_{mn}i$ used for testing, affecting factors (explained previously) etc. would be also considered.

In step 540, the RF test analyzer 310 identifies and confirms whether any anomalies exist related to the component of $Cf_{mn}$ in the PCB 350 based on the output of the verification process. If any anomalies are identified to exist related to the component of $Cf_{mn}$ in the PCB 350 then step 550 is performed. In step 550, more details about the identified anomalies are collected by the ML component of the RF test analyzer 310 and these details may be used during next level detailed scanning for identifying the detailed root causes of the anomalies.

After the iteration of the steps 520, 530, 540 and 550 for each of the component in the first set of components, $Cf_{mn}$, in the PCB 350, the RF test analyzer 310 performs step 560. In step 560, the first level scan test outcomes (i.e. details about the identified anomalies) of each of the component in the first set of components, $Cf_{mn}$, in the PCB 350 are compiled together by the RF test analyzer to provide the complete results of the first level scanning performed for the first set of components, $Cf_{mn}$, in the PCB 350.

In step 430, the results of the first level scanning performed for the first set of components, $Cf_{mn}$, in the PCB 350 is further analyzed by the RF test analyzer 310. The ML component of the RF test analyzer 310 may further perform detailed analysis based of the complete results of the first set of components, $Cf_{mn}$, in the PCB 350. In the previous steps 530 and 550 the verification and analysis are typically done for each of the component in the first set of components, $Cf_{mn}$, in the PCB 350 individually and not in combination for the whole set of components. In this step of detailed analysis of complete results of the first set of components, $Cf_{mn}$, in the PCB 350 is performed. Analysis processes like classification analysis, association analysis, correlation analysis etc. shall be done w.r.t the whole set of components. The analysis processes could be implemented using ML techniques such as NN, RL etc. The analysis is performed to identify and confirm whether any more anomalies exists for the PCB 350. If any more anomalies are existing, then more details about the identified anomalies are collected by the ML component of the RF test analyzer 310 and these details may be used during next level scanning for identifying the detailed root causes of the anomalies.

In step 440, based on the analysis of the results of the first level scanning, the RF test analyzer 310 identifies and confirms whether any anomalies exist related to first set of components, $Cf_{mn}$, of the PCB 350. If any anomalies are identified to exist related to first set of components, $Cf_{mn}$, of the PCB 350 after first level scanning then step 450 is performed. If no anomalies are identified for the first set of components, $Cf_{mn}$, of the PCB 350 after first level scanning, then step 490 is performed. In step 490, as no anomalies are identified after the first level scanning of the PCB 350, the testing process for the PCB 350 is completed. The PCB 350 is identified as having completed the testing or verification step successfully.

The first level of scanning helps in confirming at a high level whether any anomalies exist in the PCB 350 by testing only an optimal set of test scenarios for the PCB 350 and not the complete set of test scenarios. If anomalies are identified, then only a further detailed verification of the PCB 350 i.e. the second level scanning would be performed. This aids in reducing the overall testing time of a PCB. The use of ML techniques for different stages of testing also helps in increasing the efficiency and reliability of the entire testing process. This provides the advantage of testing a PCB in a more time efficient and reliable manner.

In step 450, a second level scanning of the PCB 350 is performed. The second level scanning will now be discussed in more detail, with reference to FIG. 3 and method 600 shown in FIG. 6.

The first step 610 of the second level scanning starts by the RF test analyzer 310 using the ML component in correlation with the PCB 350 and first level scanning results, for identifying another set of components in the PCB 350 and associated scanning conditions. As explained before, for each component in the another set of components in the PCB 350 there would a set of associated scanning conditions. The second level scanning is a detailed level scanning performed for a set of components of the PCB 350 and associated scanning conditions which are determined based on the anomalies identified during the first level scanning. The another set of components, $Ca_{mn}$, in the PCB 350 and associated scanning conditions, $Sa_{mn}i$, determined for the second level scanning differs from the first set of components, $Cf_{mn}$, in the PCB 350 and associated scanning conditions, $Sf_{mn}i$, identified for the first level scanning. The $Ca_{mn}$ of the PCB 350 and associated $Sa_{mn}i$ are identified based on the anomalies identified during the first level scanning. The details about the anomalies identified in step 550 and step 430 shall be used by the ML component in correlation with the PCB 350 for identifying the another set of components, $Ca_{mn}$, in the PCB 350 and associated scanning conditions, $Sa_{mn}i$. For example, an anomaly was identified for a component $Cf_{13}$, of the first set of components, $Cf_{mn}$, in the PCB 350 and associated scanning conditions, $Sf_{13}i$. The details about the anomaly identified for a component $Cf_{13}$ mentions the location point details of the RF probes 330 used for capturing the RF signals generated by the component $Cf_{13}$. The ML component using the different ML techniques like NN & RL shall determine a next possible component $C_{15}$ in the PCB for which an error could occur as it is identified to be in the vicinity of the component $Cf_{13}$ based on the location point details of the RF probes 330 mentioned in the details about the anomaly. So, the ML component shall add $Ca_{15}$ into the another set of components, $Ca_{mn}$, in the PCB 350 for second level scanning. Also, the associated scanning conditions, $Sa_{15}i$, for the component $Ca_{15}$ may include the location point details of the RF probes 330 which was used for capturing the RF signals generated by the component $Cf_{13}$ during first level scanning.

After the $Ca_{mn}$, in the PCB 350 and associated $Sa_{mn}i$ are identified, then the steps 620, 630, 640, 650 and 660 are performed iteratively for each component of $Ca_{mn}$, in the PCB 350 and its associated $Sa_{mn}i$.

In step 620, deducing a RF signature of a component of $Ca_{mn}$ in the PCB 350 based on the associated $Sa_{mn}i$ is performed by the RF test analyzer 310. The step of deducing a RF signature of a component of $Ca_{mn}$ in the PCB 350 based on the associated $Sa_{mn}i$ is performed using the steps of the method 700 shown in FIG. 7.

In step 710, the component of $Ca_{mn}$ in the PCB 350 is activated by applying a set of electromagnetic signals generated using the RF energy source 320 based on the associated $Sa_{mn}i$. In step 720, RF signals generated by the activated component of $Ca_{mn}$ in the PCB 350 based on the applied set of electromagnetic signals is captured using the RF probes 330. In step 730, the captured RF signals for the component of $Ca_{mn}$ in the PCB 350 are analyzed in the RF test analyzer 310. The steps 710, 720 and 730 are performed iteratively for each of the scanning condition in the associated $Sa_{mn}i$ for the component of $Ca_{mn}$ in the PCB 350. After the iteration, the method further comprises the step of deducing 740a RF signature by the RF test analyzer for the component of $Ca_{mn}$ in the PCB 350. The steps of the method 700 shown in FIG. 7 which was described above in detail for the component of $Cf_{mn}$ in the PCB 350 based on the associated $Sf_{mn}i$ during the first level scanning is applicable in the same manner for the component of $Ca_{mn}$ in the PCB 350 based on the associated $Sa_{mn}i$ during the second level scanning.

After deducing a RF signature of the component of $Ca_{mn}$ in the PCB 350 based on the associated $Sa_{mn}i$, the RF test analyzer 310 then performs the step 630. In step 630, the RF test analyzer 310, verifies the deduced RF signature of the component of $Ca_{mn}$ in the PCB 350 using the ML component. As stated earlier, the RF electromagnetic waves or signal outputs generated by the component of $Ca_{mn}$ in the PCB 350 varies from the original depending on the presence of any defects or anomalies in the PCB 350. Accordingly, the deduced RF signature of component of $Ca_{mn}$ in the PCB 350 would differ if there are anomalies present in the PCB 350. The deduced RF signature of the component of $Ca_{mn}$ in the PCB 350 may be compared with a reference RF signature data available in the RF testing data model. If no mappings of the deduced RF signature of the component of $Ca_{mn}$ in the PCB 350 to the reference RF signature dataset is found, then the ML component of RF test analyzer 310 would perform further verification of the deduced RF signature of component of $Ca_{mn}$ in the PCB 350. The deduced RF signature of component of $Ca_{mn}$ in the PCB 350 is further verified to identify and confirm whether any new anomalies exists, enough details about the anomaly is available to identify the detailed root causes. If enough details about the newly identified anomalies is unavailable, then there is a need identified to perform the next level scanning for detailed analysis related to component of $Ca_{mn}$ in the PCB 350. The verification process of the deduced RF signature process can comprise of different analysis processes like classification analysis, association analysis, correlation analysis etc. which could be implemented using ML techniques such as NN, RL etc. During the analysis process, various parameters pertaining to the component of $Ca_{mn}$ in the PCB 350 such as the associated $Sa_{mn}i$ used for testing, other factors which were identified during the first level scanning etc. would be also considered.

In step 640, the RF test analyzer 310 identifies and confirms whether there is a need identified to perform the next level scanning detailed analysis related to component of $Ca_{mn}$ in the PCB 350 based on the output of the verification process. If there is a need for next level scanning related to component of $Ca_{mn}$ in the PCB 350 identified, then step 650 is performed. In step 650, the RF test analyzer 310 using the ML component in correlation with the component of $Ca_{mn}$ in the PCB 350, identifies next set of components in the PCB 350 and associated scanning conditions. As explained before, for each component in the next set of components in the PCB 350 there would be a set of associated scanning conditions. The next level scanning is a detailed level scanning performed for a next set of components of the PCB 350 and associated scanning conditions which are determined based on the anomalies identified w.r.t the component of $Ca_{mn}$ in the PCB 350. The next set of components, $Cn_{mn}$, in the PCB 350 and associated scanning conditions, $Sn_{mn}i$, determined for the next level scanning differs from the second set of components, $Ca_{mn}$, in the PCB 350 and associated scanning conditions, $Sa_{mn}i$. After the $Cn_{mn}$, in the PCB 350 and associated $Sn_{mn}i$ are identified, then the steps 620, 630, and 640 are performed iteratively for each component of $Cn_{mn}$, in the PCB 350 and its associated $Sn_{mn}i$.

If the next level scanning related to component of $Ca_{mn}$ in the PCB 350 is not needed, then step 660 is performed. In step 660, more details about root causes of the identified anomalies are determined by the ML component of the RF test analyzer 310 and these details may be determined using ML techniques such as NN, RL etc.

After the iteration of the steps 620, 630, 640, 650 and 660 for each of the component in the another set of components, $Ca_{mn}$, of the PCB 350, the RF test analyzer 310 performs step 670. In step 670, the detailed root causes of the anomalies determined for each of the component in the another set of components, $Cf_{mn}$, of the PCB 350 are compiled together by the RF test analyzer 310 and further analyzed to identify any new learnings from the identified anomalies and determined detailed root causes. The new learnings are identified by correlating the root causes identified for the anomalies in the current testing with the root causes identified for the anomalies during various previous testing done by the test systems on different kinds of PCBs comprising various types components and scanning conditions. The ML component may use ML techniques like NN, RL, deep RL etc. for identifying the new learnings.

In step 680, the RF test analyzer 310, retrains the RF testing data model using the new learnings identified during the second level of scanning. Typically, new learnings are validated before applying it for retraining the RF testing data model. The ML component may analyze and validate the new learnings using the previous learnings. The ML component may use ML techniques like RL, deep RL etc. for identifying and validating the new learnings. As the testing system keeps on self-learning from each of the testing process executed, it helps in improving the test efficiency and accuracy of the testing system An illustration of the RL technique used for retraining the RF testing data model is given below:
  Step a: Validating the new learnings i.e. identified root causes of the anomalies
  Step b: Determining a Reward based on the validated identified root causes of the anomalies wherein Reward=Correctly_Identified_Anomalies/Total_Anomalies−Incorrectly_Identified_Anomalies/Total_Anomalies
  Step c: If Reward>Threshold, then retrain neural network with <input, output>=<identified_anomalies, root_causes> (Threshold is a configurable number, e.g. 0.9)

For example, the new learnings could be classified as true positive, true negative, false positive or false negative. Accordingly, the data readiness level of the RF testing data model could be also determined to identify and improve the accuracy of the testing system 300.

Using the multilayered PCB 350 illustrated in FIG. 8a-c along with reference to the testing system 300 (as shown in FIG. 3 and explained above), an example of an implementation of the above method 400 will now be described. In FIG. 8a-c, a multilayered PCB 5 with 9 layers is provided. FIG. 8a shows the top view of the PCB 350 that is the Layer 1 which comprises 4 components $C_{11}$ to $C_{14}$. FIG. 8b shows a bottom view of the PCB 350 that is the Layer 9 which comprises 3 components $C_{91}$ to $C_{93}$. FIG. 8c shows the side view of the PCB 350 that is comprising the nine layers—Layer 1 to Layer 9. In this side view, a signal line (SL) is shown connecting components between layer 1 to layer 9 and a power line (PL) is shown connecting components between layer 1 to layer 4. Typically, more than three to four components are present in each layer of a PCB and more complex connections would exist, but in order to keep the examples simple only three to four components in each layer and 2 connections are shown here. There is an anomaly or defect existing for the SL and PL due to the broken connections depicted by 'X' which is to be identified using the testing system 300.

The PCB 350 is mounted on the testing fixture 340 of the testing system 300. The RF testing data model in the ML component of the RF test analyzer 310 is already trained using the a set of reference values which consist of the different reference RF signature values identified for each components of a similar defect free or ideal PCB device as that of the one currently to be tested based on the different associated set of test scanning conditions.

After the PCB 350 is mounted, the first level scanning is performed wherein the RF test analyzer 310 using the ML component in correlation with the PCB 350 identifies a first set of components, $Cf_{mn}$, in the PCB 350 and associated scanning conditions, $Sf_{mn}i$. As stated above, the first level scanning is typically a high-level scanning which is performed on an optimal set of components of the PCB 350 and associated scanning conditions, that means the testing is performed only for a certain minimum number of components and its functionalities which is sufficient to confirm that a PCB is functioning properly without any anomalies. Let us say the minimum number of components to be tested for PCB 350 in the first level scanning are, $Cf_{mn}=\{C_{12}, C_{43}\}$ and the associated $Sf_{mn}i=\{Sf_{12}=[Position=L1, Angle of tilt=0, Frequency=f1, PCB face=top], Sf_{43}=[Position=L2, Angle of tilt=0, Frequency=(f2,f3), PCB face=bottom, depth=4]\}$.

In FIG. 9a, an illustration, is shown about the different location points (L1, L2) at which the two probes (P1, P2) are used for testing the different components in the PCB 350 during first level scanning. After $Cf_{mn}$ and associated $Sf_{mn}i$ have been identified now each component in $Cf_{mn}=\{C_{12}, C_{41}, C_{43}\}$ is tested based on the corresponding associated $Sf_{mn}i=\{Sf_{12}, Sf_{41}, Sf_{43}\}$ using RF probes 330, RF test analyzer 310 and RF energy source 320. Based on the first level scanning done, now some anomalies are identified for components $C_{12}$ & $C_{43}$ in the PCB 350. The corresponding details of the identified anomalies for components $C_{12}$ & $C_{43}$ are further analyzed by the RF test analyzer 310 to identify and confirm in certainty that anomalies exist for components $C_{12}$ & $C_{43}$.

As anomalies are identified during the first level scanning, now a further detailed verification of the PCB 350 i.e. the second level scanning would be performed. Now, the RF test analyzer 310 using the ML component in correlation with the PCB 350 and first level scanning results, identifies a first set of components, $Cf_{mn}$, in the PCB 350 and associated scanning conditions, $Sf_{mn}i$. As an anomaly was identified for $C_{12}$ & $C_{43}$ during the first level scanning based on the further details like the corresponding depth in which there could be an anomaly such as Layer 4, the angle in which the probe needs to be positioned etc. the $Ca_{mn}=\{C_{11}, C_{14}, C_{42}, C_{43}\}$ is tested based on the corresponding associated $Sa_{mn}i=\{Sa_{11}=$ [Position=(L1, L4), Angle of tilt=0, Frequency=f1, PCB face=(top, side)], $Sf_{14}$=[Position=L2, Angle of tilt=0, Frequency=(f2,f3), PCB face=top], $Sf_{42}$=[Position=L3, Angle of tilt=0, Frequency=(f1), PCB face=bottom], $Sf_{43}$= [Position=L5, Angle of tilt=x, Frequency=(f1, f4), PCB face=bottom]}.

In FIG. 9b, an illustration, is shown about the different location points (L1, L2, L3, L4, L5) at which the three probes (P1, P2, P3) are used for testing the different components in the PCB 350 during second level scanning. After $Ca_{mn}$ and associated $Sa_{mn}i$ have been identified now each component in $Ca_{mn}=\{C_{11}, C_{14}, C_{42}, C_{43}\}$ is tested based on the corresponding associated $Sa_{mn}i=\{Sa_{14}, Sa_{42}, Sa_{43}\}$ using RF probes 330, RF test analyzer 310 and RF energy source 320. Based on the second level scanning done, now anomalies are identified and it's the detailed root causes are determined for components $C_{11}, C_{14}, C_{42}$ and $C_{43}$ in the PCB 350. It is now determined that the anomalies are due to broken connection in SL and PL (as shown in FIG. 8c). The corresponding details of the identified anomalies and determined detailed root causes are further analyzed by the RF test analyzer 310 for any new learnings.

Figure 10:
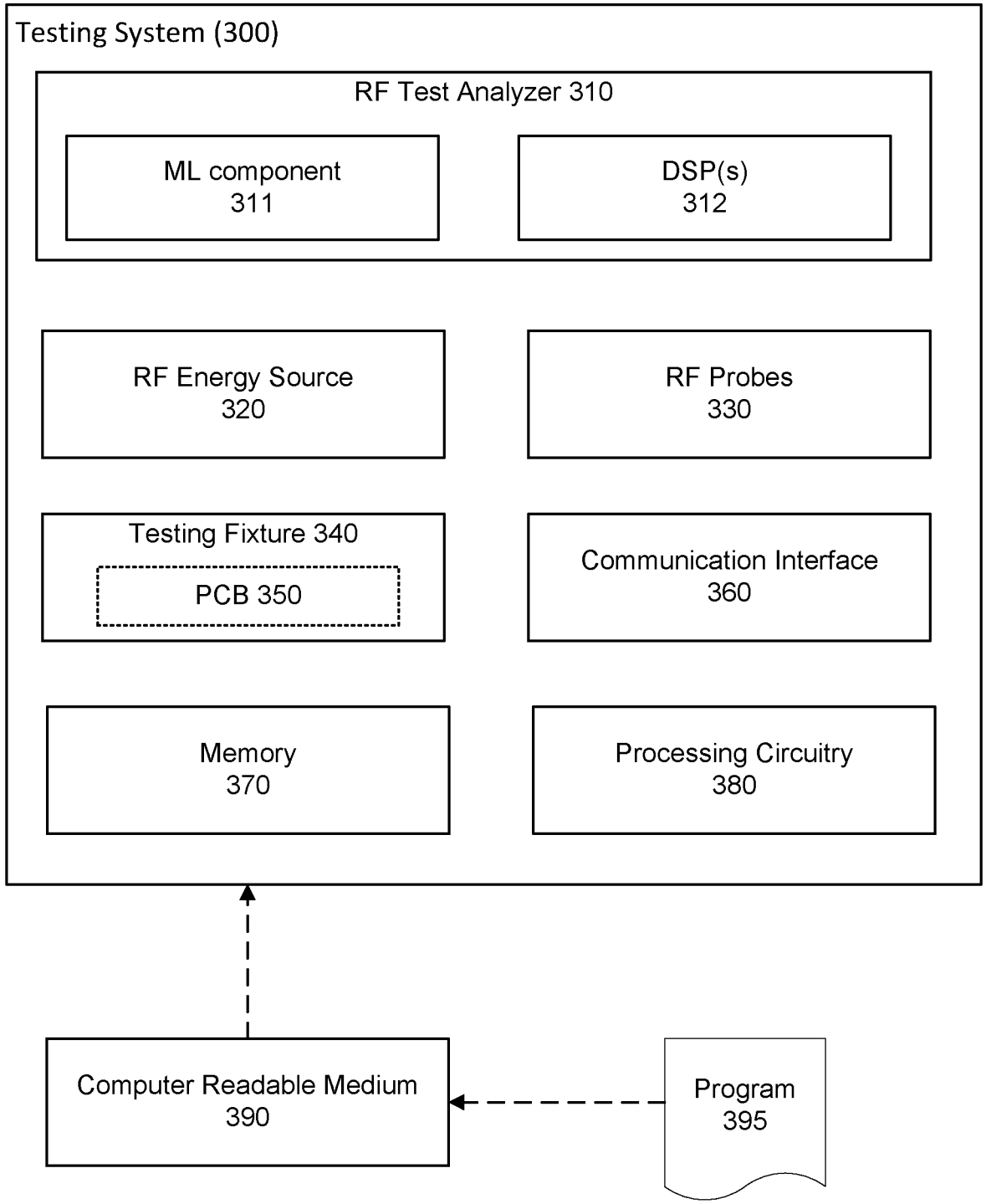
FIG. 10 shows a schematic overview depicting a testing system for testing a PCB according to a deployment of embodiments herein.

In FIG. 10, a schematic block diagram of a testing system 300 in accordance with an embodiment of the present disclosure is shown. The testing system 300 may execute methods 400, 500, 600, 700, for example, according to computer readable instructions received from a computer program. It will be understood that some of the modules illustrated in FIG. 10 are software implemented functional units or modules and may be realized in any appropriate combination of software modules.

As shown in FIG. 10, the testing system 300 may comprise a RF test analyzer 310, which is mainly used for analyzing the signals and identifying the anomalies in the PCB. The RF test analyzer 310, typically comprises a DSP 312 and ML component 311. The RF test analyzer 310 could comprise of one or more DSPs 312 which are used for processing the different RF signals. The ML component 311 shall contain different types of ML models which are typically trained using ML techniques like Neural Networks (NN), reinforcement learning (RL) etc. The testing system 300 may further comprise a testing fixture 340 on to which typically the PCB 350, which is to be tested for anomalies by the testing system 300 is mounted. The testing fixture 340 facilitates in connecting the PCB 350 to other components of the testing system 300. The testing system 300 may further comprise a RF energy source 320, which is an electric energy source used for providing predefined signals varying over time. The testing system 300 may further comprise RF probes 330, which are used for capturing the different RF signal outputs. It could include one or more RF probes 330 which are typically mounted on robotic arms to move it to different positions over the PCB 350 to capture the different RF signal outputs generated by PCBs.

The testing system 300 may further comprise a communication interface 360, which is for facilitating the communication between the different entities within as well as outside the testing system 300. In some examples, the interface may, for example, include a transceiver configured to transmit and receive radio signals over an air interface in accordance with a suitable standard. The testing system 300 may further comprise a processing circuitry (PC) 380, which may include one or more processors (e.g., a general-purpose microprocessor and/or one or more other processors, such as an application specific integrated circuit (ASIC), field-programmable gate arrays (FPGAs), and the like). The testing system 300 may further comprise a memory 370, which may be provided, e.g. for reading and/or storing data during execution of software instructions in the processor 380. The memory 370 can be any combination of read and write memory (RAM) and read only memory (ROM) and may also comprise persistent storage, which, for example, can be any single one or combination of magnetic memory, optical memory, solid state memory or even remotely mounted memory.

The testing system 300 may further comprise a computer readable storage medium 390. On this computer readable storage medium 390, a computer program 395 can be stored and the computer program 395 can cause the processor in the processing circuitry 380 and thereto operatively coupled entities and devices, such as the memory 370, RF test analyzer 310 etc. to execute methods according to the invention described herein. The computer program 395 may thus provide means for performing any steps as herein disclosed. In some embodiments, the computer-readable storage medium 390 may be a non-transitory computer-readable storage medium, such as memory stick, or stored in the cloud space.

The embodiments herein are not limited to the above described preferred embodiments. Various alternatives, modifications and equivalents may be used. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

As used herein, the expression "in some embodiments" has been used to indicate that the features of the embodiment described may be combined with any other embodiment or example disclosed herein. As used herein, the expression "in some examples" has been used to indicate that the features of the example described may be combined with any other embodiment or example disclosed herein. As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The invention claimed is:

1. A method for testing a Printed Circuit Board (PCB), the method being executed at a testing system comprising a Radio Frequency (RF) test analyzer, a RF energy source, and one or more RF probes, the method comprising:
    performing a first level scanning of a first set of components in the PCB;

identifying a first anomaly based on information obtained as a result of performing the first level scanning;

identifying a second set of components in the PCB different from the first set of components in the PCB based on the first anomaly that was identified based on the information obtained as a result of performing the first level scanning of the first set of components in the PCB;

performing a second level scanning of the second set of components in the PCB; and determining a root cause of the first anomaly based on information obtained as a result of performing the second level scanning of the second set of components.

2. The method of claim 1, further comprising:

training a RF testing data model using machine learning techniques in the RF test analyzer;

analyzing the information obtained as a result of performing the first level scanning with the trained RF testing data model in the RF test analyzer;

analyzing information obtained as a result of performing the second level scanning with the trained RF testing data model in the RF test analyzer; and retraining the RF testing data model based on identified associated new learnings using machine learning techniques in the RF test analyzer.

3. The method of claim 2, wherein performing the first level scanning further comprises:

identifying the first set of components in the PCB and associated set of scanning conditions for each component of the first set of components in the PCB using the RF test analyzer;

deducing a RF signature for each component of a general set of components in the PCB based on a general associated set of scanning conditions by the RF test analyzer, wherein the general set of components in the PCB corresponds to the first set of components in the PCB and the general associated set of scanning conditions corresponds to the associated set of scanning conditions;

identifying the first anomaly based on verifying the deduced RF signature for each component of the first set of components using the trained RF testing data model in the RF test analyzer; and providing the information obtained as a result of performing the first level scanning.

4. The method of claim 2, wherein performing the second level scanning further comprises:

determining the second set of components in the PCB and associated set of scanning conditions for each component of the second set of components in the RF test analyzer;

deducing a RF signature for each component of a general set of components in the PCB based on a general associated set of scanning conditions by the RF test analyzer, wherein the general set of components in the PCB corresponds to the second set of components in the PCB and the general associated set of scanning conditions corresponds to the associated set of scanning conditions; and performing next level scanning based on verifying the deduced RF signature for each component of the second set of components using the trained RF testing data model in the RF test analyzer.

5. The method of claim 2, wherein performing the second level scanning further comprises:

determining the root cause of the first anomaly using the RF test analyzer; and correlating the root cause and a second root cause for identifying the associated new learnings using the RF test analyzer.

6. The method of claim 5, wherein determining the root cause of the identified first anomaly comprising:

analyzing the identified first anomaly using machine learning techniques for identifying the root cause in the RF test analyzer.

7. A non-transitory computer readable storage medium storing a computer program comprising computer-executable instruction for causing a testing system to perform the method of claim 1.

8. The method of claim 1, wherein the first set of components comprises a first component located in a first layer of the PCB, determining, based on the first anomaly, that an anomaly exists in the first layer of the PCB, and identifying the second set of components in the PCB based on the first anomaly comprises:

as a result of determining that an anomaly exists in the first layer of the PCB, a) selecting a component that i) was not scanned during the first level scanning and ii) is located in the first layer of the PCB and b) adding the identified component to the second set of components.

9. A testing system configured for testing a Printed Circuit Board (PCB), comprising:

a Radio Frequency (RF) test analyzer;

a RF energy source;

one or more RF probes;

a memory; and a processor circuitry configured to:

perform a first level scanning of a first set of components in the PCB;

identify a first anomaly based on information obtained as a result of performing the first level scanning;

identify a second set of components in the PCB different from the first set of components in the PCB based on the first anomaly that was identified based on the information obtained as a result of performing the first level scanning of the first set of components in the PCB;

perform a second level scanning of the second set of components in the PCB; and determine a root cause of the first anomaly based on information obtained as a result of performing the second level scanning of the second set of components.

10. The testing system of claim 9, further configured to:

train a RF testing data model using machine learning techniques in the RF test analyzer;

analyze the information obtained as a result of performing the first level scanning with the trained RF testing data model in the RF test analyzer;

analyze information obtained as a result of performing the second level scanning with the trained RF testing data model in the RF test analyzer; and retrain the RF testing data model based on identified associated new learnings using machine learning techniques in the RF test analyzer.

11. The testing system of claim 10, wherein to perform the first level scanning comprises to:

identify the first set of components in the PCB and associated set of scanning conditions for each component of the first set of components in the PCB using the RF test analyzer;

deduce a RF signature for each component of a general set of components in the PCB based on a general associated set of scanning conditions by the RF test analyzer, wherein the general set of components in the PCB corresponds to the first set of components in the PCB and the general associated set of scanning conditions corresponds to the associated set of scanning conditions;

identify the first anomaly based on verifying the deduced RF signature for each component of the first set of components using the trained RF testing data model in the RF test analyzer; and provide the information obtained as a result of performing the first level scanning.

12. The testing system of claim 11, wherein to deduce the RF signature for each component of the general set of components in the PCB comprises to:

activate each component of the general set of components in the PCB by applying a set of electromagnetic signals generated using the RF energy source based on the general associated set of scanning conditions for each component of the general set of components;

capture RF signals generated by each activated component of the general set of components based on the applied set of electromagnetic signals using the RF probes; and deduce the RF signature by the RF test analyzer for each component of the general set of components based on analyzing the captured RF signals for each component of the general set of components provided to the RF test analyzer by the RF probes.

13. The testing system of claim 11, wherein the scanning conditions are based on: functionalities of a component to be verified, different positions of testing, and/or depth level of the component in the PCB.

14. The testing system of claim 10, wherein to perform the second level scanning comprises to:

determine the second set of components in the PCB and associated set of scanning conditions for each component of the second set of components in the RF test analyzer;

deduce a RF signature for each component of a general set of components in the PCB based on a general associated set of scanning conditions by the RF test analyzer, wherein the general set of components in the PCB corresponds to the second set of components in the PCB and the general associated set of scanning conditions corresponds to the associated set of scanning conditions; and perform next level scanning based on verifying the deduced RF signature for each component of the second set of components using the trained RF testing data model in the RF test analyzer.

15. The testing system of claim 14, wherein to determine the second set of components in the PCB and associated set of scanning conditions for each component of the second set of components comprises to:

identify the second set of components in the PCB and associated set of scanning conditions for each component of the second set of components based on the first anomaly using the trained RF testing data model in the RF test analyzer.

16. The testing system of claim 14, wherein to perform next level scanning comprises to:

determine a third set of components in the PCB and associated set of scanning conditions for each component of the third set of components in the RF test analyzer.

17. The testing system of claim 10, wherein to perform the second level scanning comprises to:

determine the root cause of the first anomaly using the RF test analyzer; and correlate the root cause and a second root cause for identifying the associated new learnings using the RF test analyzer.

18. The testing system of claim 17, wherein to determine the root cause of the first anomaly comprises to:

analyze the identified first anomaly using machine learning techniques for identifying the root cause in the RF test analyzer.

19. The testing system of claim 17, wherein to correlate the root cause and the second root cause for identifying the associated new learnings comprises to:

identify the associated new learnings by correlating the root cause and the second root cause using machine learning techniques in the RF test analyzer.

20. The testing system of claim 9, wherein the first level scanning is a high-level scanning performed on a minimal number of components and associated set of scanning conditions.

21. The testing system of claim 9, wherein the second level scanning is a detailed level scanning performed for the second set of components and associated set of scanning conditions identified based on the first anomaly.

* * * * *